United States Patent
Schiff et al.

(10) Patent No.: US 6,683,441 B2
(45) Date of Patent: Jan. 27, 2004

(54) MULTI-PHASE SWITCHING REGULATOR

(75) Inventors: Tod F. Schiff, Portland, OR (US);
Joseph C. Buxton, Palo Alto, CA (US);
Richard Redl, Farvagny-le-Petit (CH)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 10/284,222

(22) Filed: Oct. 30, 2002

(65) Prior Publication Data

US 2003/0102849 A1 Jun. 5, 2003

Related U.S. Application Data

(60) Provisional application No. 60/333,404, filed on Nov. 26, 2001.

(51) Int. Cl.[7] .............................................. G05F 1/652
(52) U.S. Cl. ...................... 323/222; 323/224; 323/285
(58) Field of Search ................... 323/222, 224, 323/282, 285

(56) References Cited

U.S. PATENT DOCUMENTS

| | | | | |
|---|---|---|---|---|
| 4,384,321 A | * | 5/1983 | Rippel ........................ 363/124 |
| 5,770,940 A | | 6/1998 | Goder ........................ 323/282 |
| 5,847,554 A | | 12/1998 | Wilcox et al. .............. 323/282 |
| 5,852,557 A | * | 12/1998 | Woodward .................. 363/124 |
| 5,929,614 A | * | 7/1999 | Copple ....................... 323/222 |
| 5,982,160 A | * | 11/1999 | Walters et al. ............. 323/282 |
| 6,144,194 A | | 11/2000 | Varga ........................ 323/285 |
| 6,278,263 B1 | | 8/2001 | Walters et al. ............. 323/272 |
| 6,388,429 B1 | * | 5/2002 | Mao .......................... 323/222 |
| 6,404,175 B1 | * | 6/2002 | Yang et al. ................. 323/282 |
| 6,608,770 B2 | * | 8/2003 | Vinciarelli et al. .......... 363/61 |

OTHER PUBLICATIONS

Analog Devices, 5–Bit Programmable 2–Phase Synchronous Buck Controller, ADP3160/ADP3167, p. 1–16 (2002).
Semiconductor Components Industries, LLC, Three–Phase Buck Controller with Integrated Gate Drivers and Power Good, CS5301, (Oct. 2002–Rev. 11), p. 1–20.
Intersil Americas Inc., Microprocessor CORE Voltage Regulator Multi–Phase Buck PWM Controller, HIP6301 (Jun. 2002) Data Sheet, FN4765.2 , p. 1–18.

* cited by examiner

*Primary Examiner*—Bao Q. Vu
(74) *Attorney, Agent, or Firm*—Koppel, Jacobs, Patrick & Heybl

(57) ABSTRACT

An N-phase switching voltage regulator includes N current sensing elements which carry respective phase currents. The voltages present at the switch node sides of the sensing elements are summed and presented to an amplifier which also receives the regulator's output voltage, to produce an output which is proportional to the regulator's total output current $I_{out}$. The invention also provides a means for direct insertion of total inductor output current information into a regulator's voltage-mode control loop, to provide active voltage positioning (AVP) for the output voltage. A voltage based on total inductor output current is summed with the regulator's reference voltage; this sum and $V_{out}$ are applied to the voltage control error amplifier, the output of which is processed to operate the regulator's switches. This enables the regulator's output to have a desired droop impedance and to provide AVP of $V_{out}$ as a function of total filtered inductor output current $I_{out(fltr)}$.

26 Claims, 6 Drawing Sheets

MULTI-PHASE SWITCHING REGULATOR

REFERENCE TO EARLIER APPLICATIONS

This application claims the benefit of provisional patent application No. 60/333,404 to Schiff et al., filed Nov. 26, 2001.

BACKGROUND OF THE INVENTION

1. Field of the Invention

This invention relates to the field of switching voltage regulators, and particularly to multi-phase switching voltage regulators.

2. Description of the Related Art

Switching voltage regulators provide a predetermined and substantially constant output voltage from a source voltage that may be fluctuating, or that may be at an inappropriate amplitude for the load. Such regulators typically employ one or more switching elements. The switching elements may be, for example, field-effect transistor (FET) switches. Control circuitry regulates the current supplied to the load by varying the ON-OFF times of the switching elements (i.e., the regulator's duty cycle, which is the percentage of time that a switch is ON during a cycle of operation). Inductors and capacitors are typically used to convert the switched current pulses into a steady flow of load current. Switching regulators are frequently used in portable battery-powered electronic products, as they provide high operating efficiency and long battery life with little heat generation.

A switching voltage regulator may be arranged to operate using one or more different regulation modes. For example, for voltage-mode regulation, a feedback signal $V_{fb}$ which varies with the regulator's output voltage is fed to a comparator along with a periodic sawtooth waveform; the comparator's output controls the duty cycle of the switching elements. For current-mode regulation, a voltage $V_i$ is generated which is proportional to the current in the output inductor. $V_i$ and $V_{fb}$ are provided as inputs to a comparator, the output of which controls the duty cycle of the switching elements.

Several methods have been employed to obtain inductor current information for use in a switching regulator's control loop. Typically, a small voltage is sensed, either continuously or periodically sampled, to determine the current. One approach is described in U.S. Pat. No. 5,982,160 to Walters et al., in which an R-C network is connected across the output inductor, with the small resulting signal sent to the controller. Another approach is described in U.S. Pat. No. 5,847554 to Wilcox et al., which samples the voltage drop across the regulator's MOSFET switches when they are on.

Advanced microprocessors require power supplies that provide a low voltage (e.g., <2 volts) at high current. One way in which high currents are provided is with a multi-phase switching regulator, in which the components of a number (N) of single-phase regulators are repeated to produce N output currents, which are summed together to provide the total output current. However, implementing any of the regulators cited above as a multi-phase regulator requires summing and/or sampling data in the controller IC, which can introduce unwanted complexity and processing delays into the IC design.

Another switching regulator issue concerns maintaining the output voltage within specified limits in response to load transients. One approach to this problem is known as "adaptive voltage positioning" (AVP), in which the output voltage is positioned within the specified range so that it best withstands a load transient. This is conventionally accomplished by establishing a "droop impedance" for the output, by inserting information about the desired output current droop into the output voltage feedback loop as an error signal. However, this approach can result in sluggish and imprecise control on the output voltage for dynamic changes in the load.

SUMMARY OF THE INVENTION

A multi-phase switching voltage regulator is presented which overcomes the problems noted above, enabling precise multiple-loop control which is particularly well suited to AVP power supplies.

The invention provides a "total current circuit", which makes use of an amplifier circuit to sum together individual phase currents to generate a signal representing the total instantaneous output current in the inductors $I_{out}$. For an N-phase switching regulator, N current sensing elements—which can be the output inductors themselves or current sense resistors connected in series with the inductors—carry respective phase currents. A summing circuit, preferably made from N resistors each having a resistance $R_p$, is connected to sum the voltages present at the switch node sides of the sensing elements, and to provide the summed voltages at a summing node. An amplifier circuit is connected to the summing node at a first input and to the regulator's output terminal at a second input, and produces an output voltage $V_{cs}$. When $V_{out}$ is subtracted from $V_{cs}$, the result is proportional to $I_{out}$.

The amplifier circuit preferably comprises an operational amplifier, with a feedback resistor having a resistance $R_{cs}$, and a filter capacitor having a capacitance $C_{cs}$ connected across the feedback resistor. The op amp is arranged such that, when the time constant $R_{cs}C_{cs}$ is made substantially equal to the inductors' time constant $L/R_1$, the output voltage $V_{cs}$ of the op amp is given by:

$$V_{cs} = V_{out} - \frac{R_l R_{cs}}{R_p} I_{out},$$

where $R_1$ is the inductors' resistance and $V_{out}$ is the regulator's output voltage. $V_{cs}$ is thus proportional to total instantaneous inductor output current $I_{out}$.

The invention also provides a unique means for direct insertion of total inductor output current information into a switching regulator's voltage-mode control loop, to provide AVP for the output voltage. A desired output voltage is specified by providing a reference voltage $V_{ref}$, and a current circuit—preferably the total current circuit described above—produces an output voltage $V_{droop}$ which varies with the the regulator's total filtered instantaneous output current $I_{out(fltr)}$. A summation circuit produces an output voltage $V_{set}$ which is given by:

$$V_{set} = V_{ref} + V_{droop}.$$

$V_{set}$ and $V_{out}$ are presented to the inputs of a voltage control error amplifier circuit, which produces an output $V_{err}$ that varies with the difference between $V_{set}$ and $V_{out}$. A control circuit operates the regulator's switches in response to $V_{err}$. The control circuit, total current circuit, summation circuit, and voltage control error amplifier circuit are arranged such that the regulator's output has a desired droop impedance $R_o$, to provide AVP of $V_{out}$ as a function of the total filtered instantaneous inductor output current $I_{out(fltr)}$. This serves to directly insert instantaneous inductor output current information into the reference voltage input of the regulator's voltage control error amplifier, which enables fast, accurate control of output voltage for dynamic changes in load.

Further features and advantages of the invention will be apparent to those skilled in the art from the following detailed description, taken together with the accompanying drawings.

DETAILED DESCRIPTION OF THE INVENTION

Figure 1:
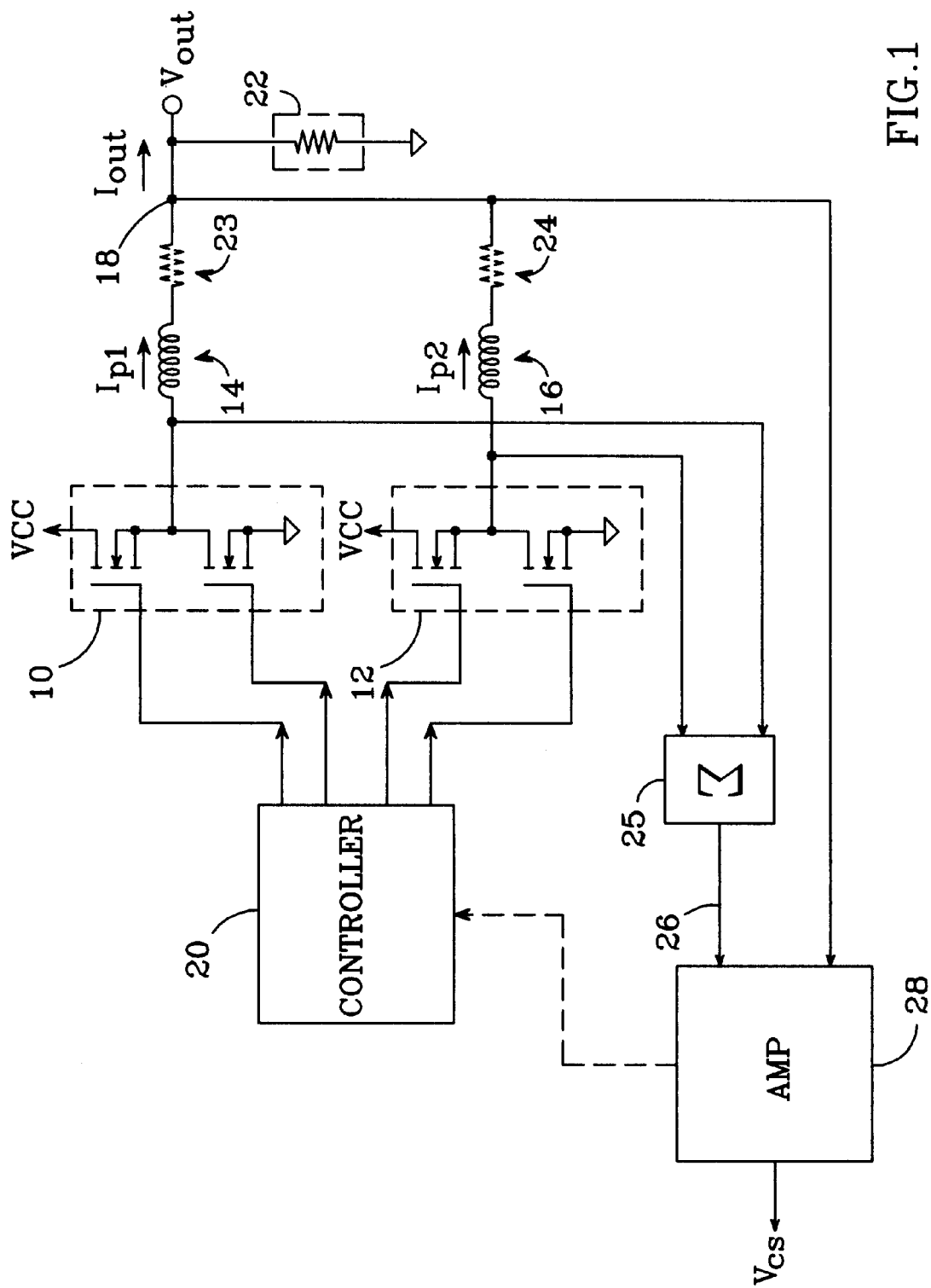
FIG. 1 is a schematic/block diagram of a total current circuit for a multi-phase switching regulator per the present invention.

A schematic/block diagram illustrating the principles of a total current circuit for a multi-phase switching regulator in accordance with the present invention is shown in FIG. 1. The number of phases is identified herein as "N"; e.g., for the exemplary regulator shown in FIG. 1, N=2. For each phase, the regulator includes a switching element (10,12) made up of one or more switching transistors, with each switching element connected to the "switch node" side of a respective output inductor (14, 16). The opposite, "output" sides of the inductors are connected together at a common output terminal 18. The N switching elements are operated by a controller 20, which operates the elements so as to provide an output voltage $V_{out}$ at output terminal 18 and an total inductor output current $I_{out}$ to a load 22. Load 22 normally includes a parallel filter capacitor (not shown) to reduce the ripple voltage component of the output voltage $V_{out}$. Each inductor carries a respective phase current $I_{px}$ (x=1, 2, . . . ), which are summed together at output terminal 18 to provide total inductor output current $I_{out}$.

The present total current circuit includes N "current sensing elements". The current sensing elements may be the output inductors themselves, or current sense resistors (23, 24) connected in series between each inductor and output terminal 18. Each current sensing element carries a respective phase current $I_{px}$. A summing circuit 25 is connected to sum the N voltages present at the switch node sides of the circuit's current sensing elements: when the sensing elements are the inductors, circuit 25 is connected to the inductors' switch node sides; when sense resistors are used, circuit 25 is connected to the resistors' inductor sides. The summed voltages are provided at a summing node 26.

The present total current circuit also includes an amplifier circuit 28, which is connected to summing node 26 at a first input and to the regulator's output voltage $V_{out}$. Amplifier circuit 28 is arranged to sum together the individual phase currents to generate an output voltage ($V_{cs}$) which directly represents the total instantaneous inductor output current $I_{out}$. Output voltage $V_{cs}$ can then be used, for example, as an input to controller 20 to provide current-mode control of the regulator, or as an input to a current limiting circuit.

Note that, though a two-phase switching regulator is shown in FIG. 1, the invention can be extended to any number of phases.

Figure 2:
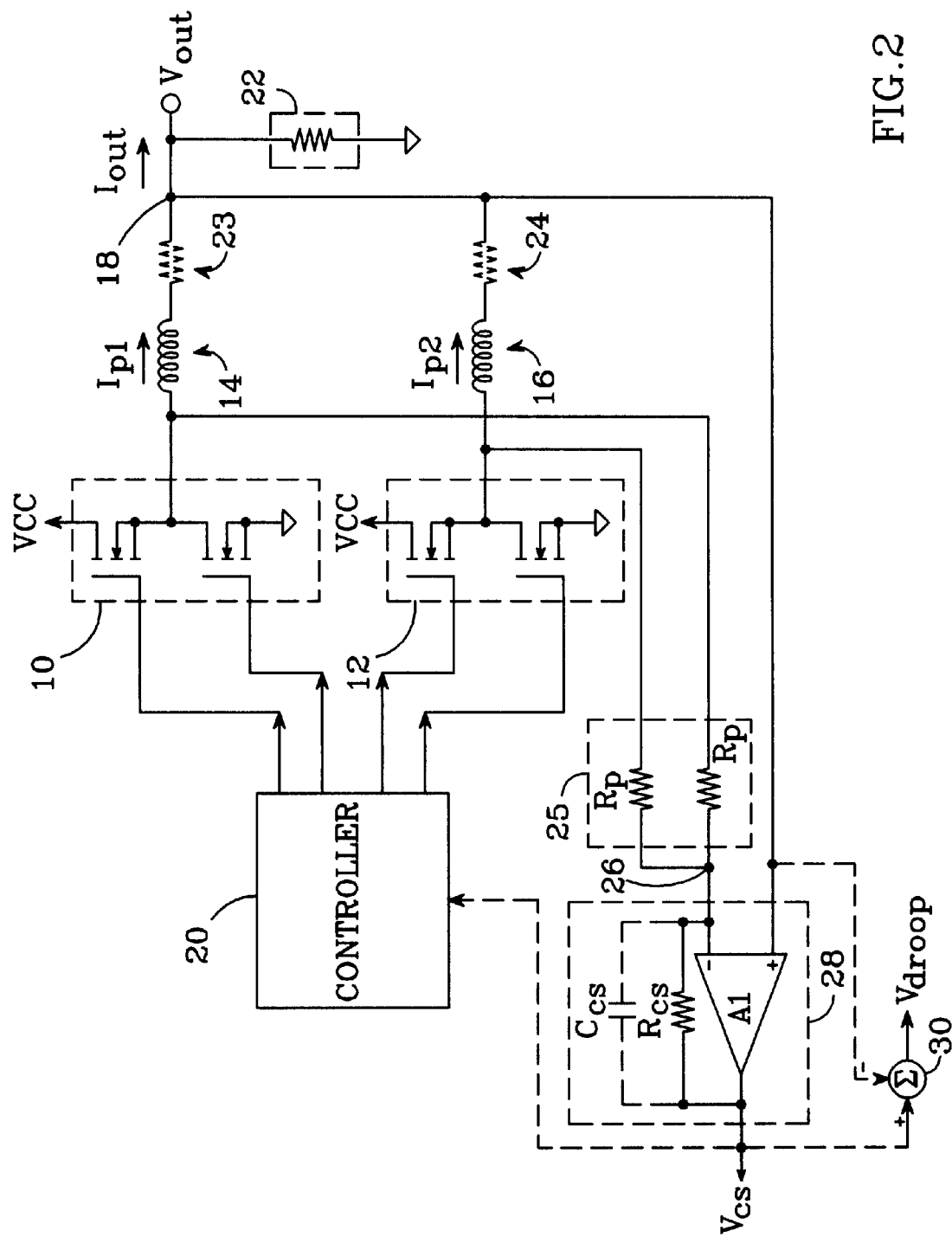
FIG. 2 is a schematic/block diagram of a preferred embodiment of a total current circuit for a multi-phase switching regulator per the present invention.

A preferred embodiment of a total current circuit for a multi-phase switching regulator in accordance with the present invention is shown in FIG. 2. Summing circuit 25 is preferably implemented with N resistors, each of which has a resistance $R_p$ and is connected to the switch node side of a respective current sensing element at one end and to summing node 26 at its other end.

Amplifier circuit 28 preferably comprises an operational amplifier A1, having its inverting input connected to summing node 26 and its non-inverting input connected to $V_{out}$. A feedback resistor having a resistance $R_{cs}$ is connected between the A1's output and inverting input; $R_{cs}$ sets the A1's gain, and the load line required by the system being powered. A filter capacitor having a capacitance $C_{cs}$ is preferably connected across $R_{cs}$. When so arranged, the output voltage $V_{cs}$ produced by A1 is approximately given by:

$$V_{cs} = V_{out} - \frac{R_{cs}R_l\left(1 + s\frac{L}{R_l}\right)}{R_p(1 + sC_{cs}R_{cs})} I_{out}, \qquad [\text{Eq. 1}]$$

where $R_1$ and L are the resistance and inductance values, respectively, for output inductors 14 and 16. Equation 1 presumes that $R_1$ and L are approximately equal for all output inductors and that all summing resistors have a resistance approximately equal to $R_p$; those skilled in the art can calculate $V_{cs}$ precisely for non-equal values.

As shown in equation 1, if $V_{out}$ is subtracted from $V_{cs}$, the result is proportional to the regulator's total instantaneous inductor output current $I_{out}$, with the proportionality varying with frequency. If the time constant $C_{cs}R_{cs}$ is made substantially equal to the time constant $L/R_1$ of each output inductor (again presuming that $R_1$ and L are approximately equal for all output inductors), the equation for output voltage $V_{cs}$ simplifies to:

$$V_{cs} = V_{out} - \frac{R_l R_{cs}}{R_p} I_{out}. \qquad [\text{Eq. 2}]$$

The $V_{out}$ term can be removed from equation 2 with the use of a summation circuit 30, which receives $V_{cs}$ at one input, $V_{out}$ at a second input and produces an output $V_{droop}$ given by:

$$V_{droop} = V_{cs} - V_{out} = -\frac{R_l R_{cs}}{R_p} I_{out} = -R_o I_{out}, \qquad [\text{Eq. 3}]$$

where $R_o$ is the regulator's output or "droop" impedance, given by:

$$R_o = \frac{R_l R_{cs}}{R_p} \qquad [\text{Eq. 4}]$$

Thus, when the $C_{cs}R_{cs}$ and $L/R_1$ time constants are made substantially equal, $V_{droop}$ is directly proportional to total inductor output current $I_{out}$. The amplitude of $V_{droop}$ can be set by properly selecting the value of $R_{cs}$, which is also used to establish the regulator's droop impedance $R_o$. Signals $V_{cs}$ and/or $V_{droop}$ can be used, for example, as a feedback signal provided to controller 20 for one or more of the regulator's control loops, or for monitoring the output current with respect to a current limit. $V_{cs}$ and/or $V_{droop}$ could also be used as a feedback signal in a switching regulator which employs AVP. Note, however, that the present total current circuit can be used with any single or multi-phase switching regulator, with or without AVP. The $V_{droop}$ signal can be used to implement AVP, giving the regulator a finite output impedance.

When so arranged, the present total current circuit offers high speed and accurate continuous sensing of total inductor output current. Sensing the total inductor current at the output is an inherently more accurate method than other current sensing methods such as peak current detection in the high side MOSFET or sampling the current across a sense element such as the low side MOSFET.

Note that if current sense resistors (23,24) are used as the current sensing elements instead of the output inductors (14,16), the need for filter capacitance $C_{cs}$ is eliminated.

The resistance $R_1$ of the output inductors is due to their copper windings. As such, $R_1$ has an associated temperature dependence, represented herein with a temperature coefficient $t_c$. To compensate for this and thereby improve the accuracy of the total current circuit, feedback resistance $R_{cs}$ can be selected to have a temperature coefficient which is approximately equal to $-t_c$. Making the temperature coefficient of $R_{cs}$ equal to $-t_c$ also provides continuous time constant tracking; i.e., time constant $C_{cs}R_{cs}$ remains substantially equal to time constant $L/R_1$ over temperature. This provides the invention an advantage over prior art designs, in that a single resistor and capacitor are used to provide $C_{cs}R_{cs}=L/R_1$, whereas in the prior art, such as U.S. Pat. No. 5,982,160 discussed above, individual R-C networks are required across each inductor.

Amplifier circuit 28 can be realized with, for example, a current feedback or voltage feedback op amp, a transconductance amplifier, or any number of other implementations. Amplifier circuit 28 preferably has a monotonic relationship between its output voltage and the difference between its two inputs. The amplifier also preferably has a low offset input voltage to provide good accuracy, and a high gain (if it is an op amp) or a constant gain (if it is a transconductance amplifier).

Figure 3:
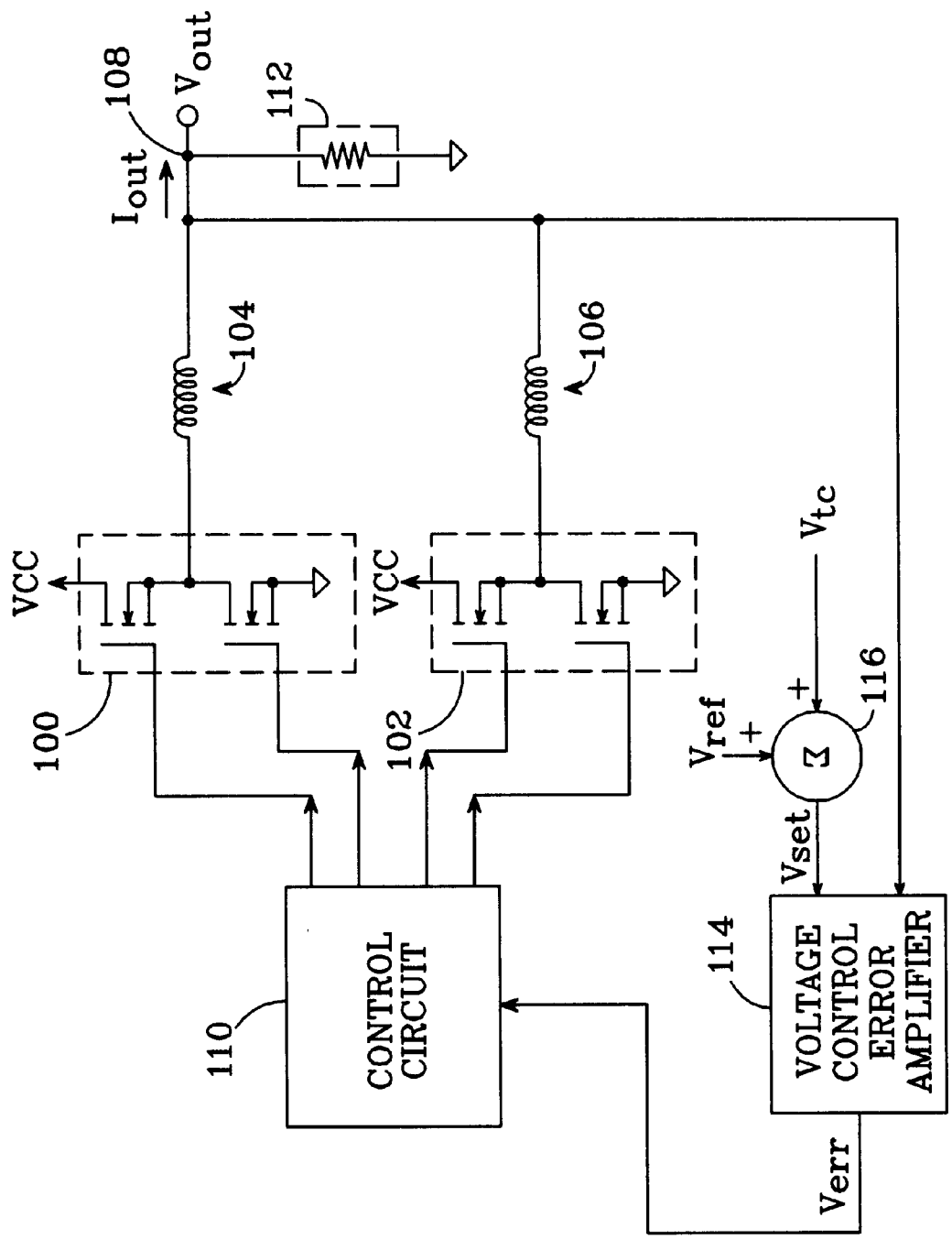
FIG. 3 is a schematic/block diagram of a voltage-mode control loop for a multi-phase switching regulator per the present invention.

The basic principles of a voltage-mode control loop for use in a switching voltage regulator which employs AVP is shown in FIG. 3. For each phase, the regulator includes a switching element (100,102) made up of one or more switching transistors, with each switching element connected to the switch node side of a respective output inductor (104, 106). The opposite, "output" sides of the inductors are connected together at a common output terminal 108. The switching elements are operated by a control circuit 110, which operates the elements so as to provide an output voltage $V_{out}$ at output terminal 108 and an total inductor output current $I_{out}$ to a load 112.

As noted above, AVP is conventionally accomplished by inserting total inductor output current information into the output voltage feedback loop as an error signal. However, this approach can result in sluggish and imprecise control of the output voltage for dynamic changes in the load. The invention overcomes this by inserting total inductor output current information directly into the reference voltage input of the regulator's voltage control error amplifier 114. Amplifier 114 receives a voltage $V_{set}$ at one input and output voltage $V_{out}$ at a second input, and is arranged to provide a feedback signal $V_{err}$ to control circuit 110 to make $V_{out}=V_{set}$. The present voltage-mode control loop includes a summation circuit 116, which receives a voltage $V_{ref}$ representing the desired output voltage at one input, and a voltage $V_{tc}$ representing the regulator's total inductor output current at a second input, and produces voltage $V_{set}=V_{ref}+V_{tc}$ at its output. By so doing, total current signal $V_{tc}$ offsets reference voltage $V_{ref}$ to reposition output voltage $V_{out}$ based on the total inductor output current $I_{out}$, thereby providing AVP. This approach provides faster feedback of the total inductor output current information into the voltage-mode control loop, when compared with prior art methods which insert the total inductor output current information into the output voltage feedback as an error signal.

Figure 4:
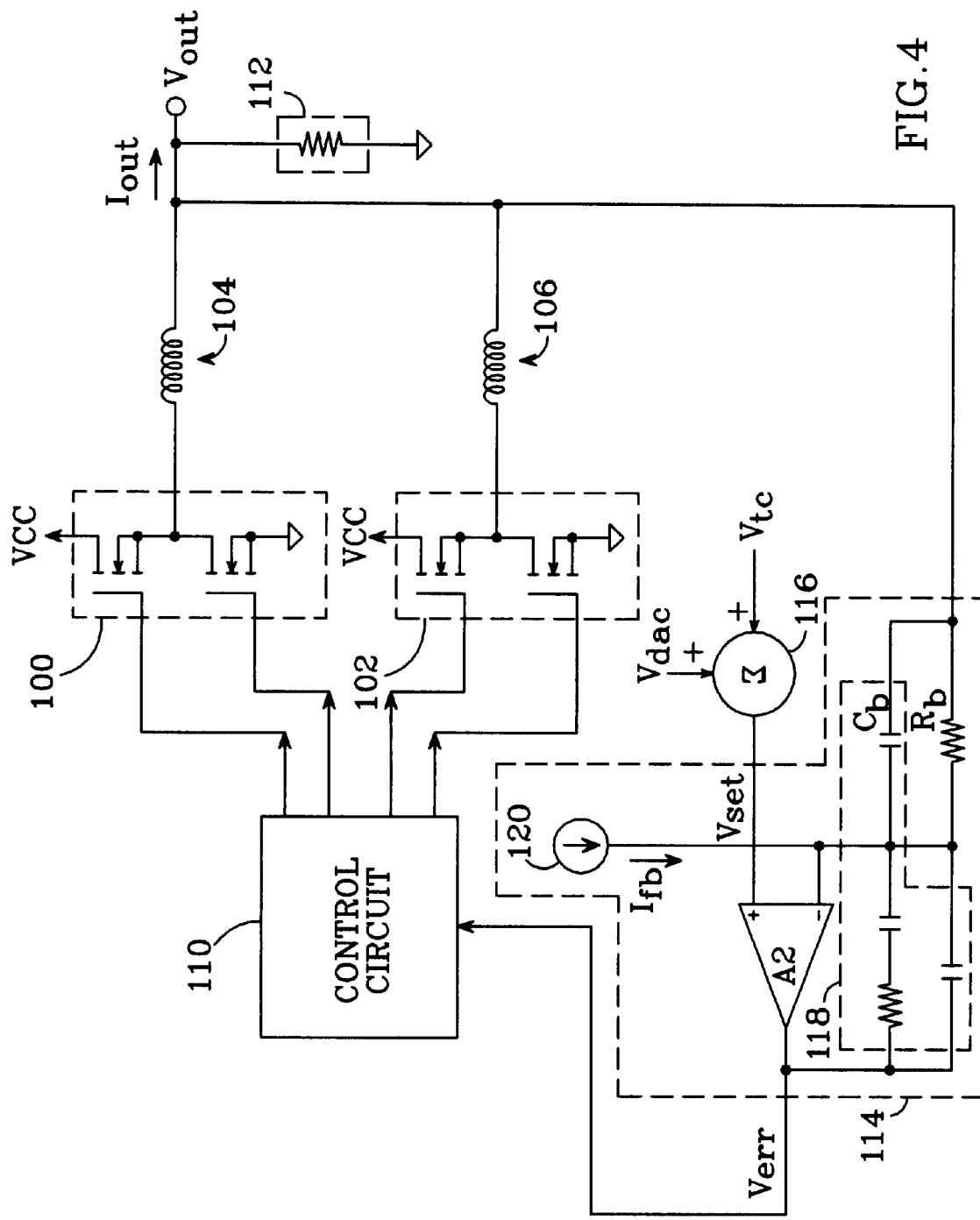
FIG. 4 is a schematic/block diagram of a preferred embodiment of a voltage-mode control loop for a multi-phase switching regulator per the present invention.

FIG. 4 is a diagram of a preferred embodiment of a voltage-mode control loop for a multi-phase switching regulator per the present invention. Voltage control error amplifier circuit 114 preferably comprises an operational amplifier A2, which receives voltage $V_{set}$ from summation circuit 116 at its non-inverting input, and a voltage which represents $V_{out}$ at its inverting input. A loop compensation network 118 is connected between A2's output and its inverting input. Since the reference voltage provided to summation circuit 116 is often provided by a digital-to-analog converter (DAC), $V_{ref}$ is identified as "$V_{dac}$" in FIG. 4.

When the circuit generating voltage $V_{tc}$ is arranged such that $V_{tc}=-I_{out}R_o$, where $R_o$ is the droop impedance, then the regulated output voltage $V_{out}$ produced by the regulator of FIG. 4 is given by:

$$V_{out}=V_{dac}-I_{out(fltr)}R_o,$$

where $I_{out(fltr)}$ is the total inductor current without its ripple component, i.e. the filtered total inductor current. Thus, the desired output voltage $V_{dac}$ is offset by the output droop impedance ($R_o$) times the filtered output current ($I_{out(fltr)}$), to provide AVP of output voltage $V_{out}$.

A2's inverting input may be connected to $V_{out}$ directly for a transconductance amplifier, or through a series resistance $R_b$ for an operational amplifieras shown in FIG. 4. For the preferred embodiment, the resistor $R_b$ and a current source 120 which causes a current $I_{fb}$ to flow through $R_b$ sets the no-load offset voltage from the reference voltage ($V_{dac}$) in AVP converters, such that the regulated output voltage $V_{out}$ is given by:

$$V_{out}=V_{dac}-I_{out(fltr)}R_o-I_{fb}R_b.$$

Loop compensation network 118 may optionally include a capacitor having a capacitance $C_b$ connected across resistance $R_b$ to provide lead compensation. The loop compensation network 118 may be set up such that the regulator's output impedance, including the parallel filter capacitor of the load, is substantially equal to the droop resistance $R_o$ over a wide frequency range.

The novel voltage-mode control loop preferably receives voltage $V_{tc}$ from the total current circuit described above. This is illustrated with reference to the multi-phase switching regulator shown in FIG. 5. For each phase, the regulator includes a switching element (200, 202) made up of one or more switching transistors, with each switching element connected to the switch node side of a respective output inductor (204, 206). The opposite sides of the inductors are connected together at a common output terminal 208. The switching elements are operated by a control circuit 210, which operates the elements so as to provide an output voltage $V_{out}$ at output terminal 208 and an total inductor output current $I_{out}$ to a load 212.

Here, a total current circuit in accordance with the present invention produces voltage $V_{droop}$, which is proportional to the regulator's total inductor output current $I_{out}$. Summing circuit 25 sums the voltages at the switch node sides of output inductors 204 and 206 at a summing node 26. The summed voltages are fed to amplifier circuit 28, preferably implemented with op amp A1 and feedback resistance and capacitance $R_{cs}$ and $C_{cs}$, respectively. Op amp A1 also receives output voltage $V_{out}$ at an input, and produces voltage $V_{cs}$ at its output. Subtractor circuit 30 subtracts $V_{out}$ from $V_{cs}$ to produce $V_{droop}$.

$V_{droop}$ is provided to the summation circuit 30 of a voltage-mode control loop per the present invention, along with reference voltage $V_{ref}$ which represents the desired output voltage. $V_{droop}$ thus offsets $V_{ref}$, with voltage $V_{set}$ resulting. $V_{set}$ is provided to voltage control error amplifier 114, which is preferably implemented with op amp A2, loop compensation network 118, current source 120, resistance $R_b$, and capacitance $C_b$. The output of A2 is provided to control circuit 210 to provide the regulated output voltage with AVP.

When so arranged, and if time constant $C_{cs}R_{cs}$ is made substantially equal to the output inductors' time constant $L/R_1$ (where L and $R_1$ are the inductance and resistance, respectively, of each output inductor), the regulated output voltage $V_{out}$ is given by:

$$V_{out}=V_{dac}-I_{out(fltr)}R_o-I_{fb}R_b,$$

where droop impedance $R_o$ is given by:

$$R_o = \frac{R_l R_{cs}}{R_p}.$$

This arrangement provides a novel method for creating a signal ($V_{droop}$) proportional to total filtered inductor output current ($I_{out(fltr)}$), as well as a unique method of inserting the output current information into the voltage control loop for providing AVP of the output.

As noted above, though FIG. 5 depicts a two-phase regulator, the invention is intended to encompass all single and multi-phase converters, with or without AVP.

Figure 5:
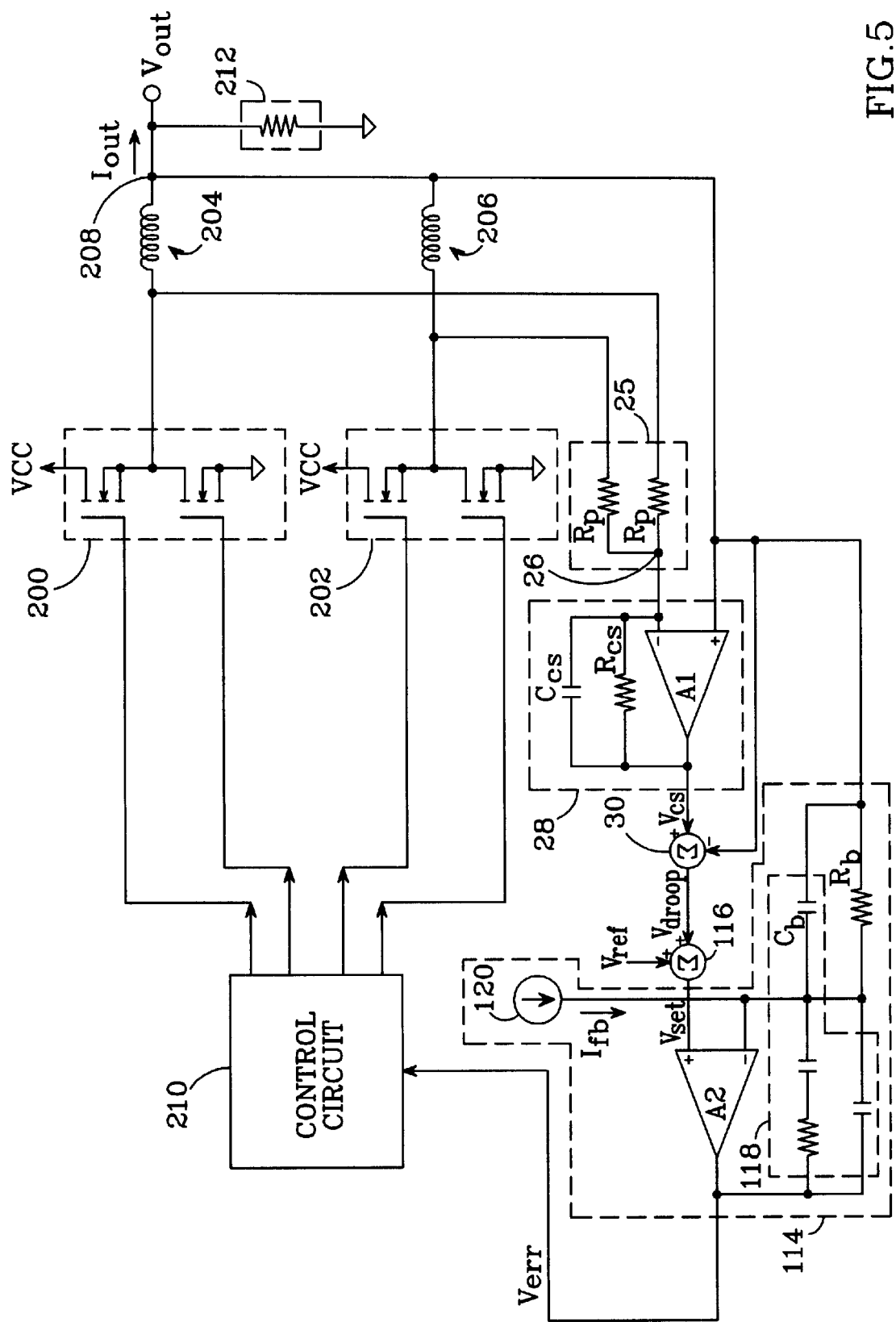
FIG. 5 is a schematic/block diagram of a multi-phase switching regulator which includes a total current circuit and a voltage-mode control loop per the present invention.
Figure 6:
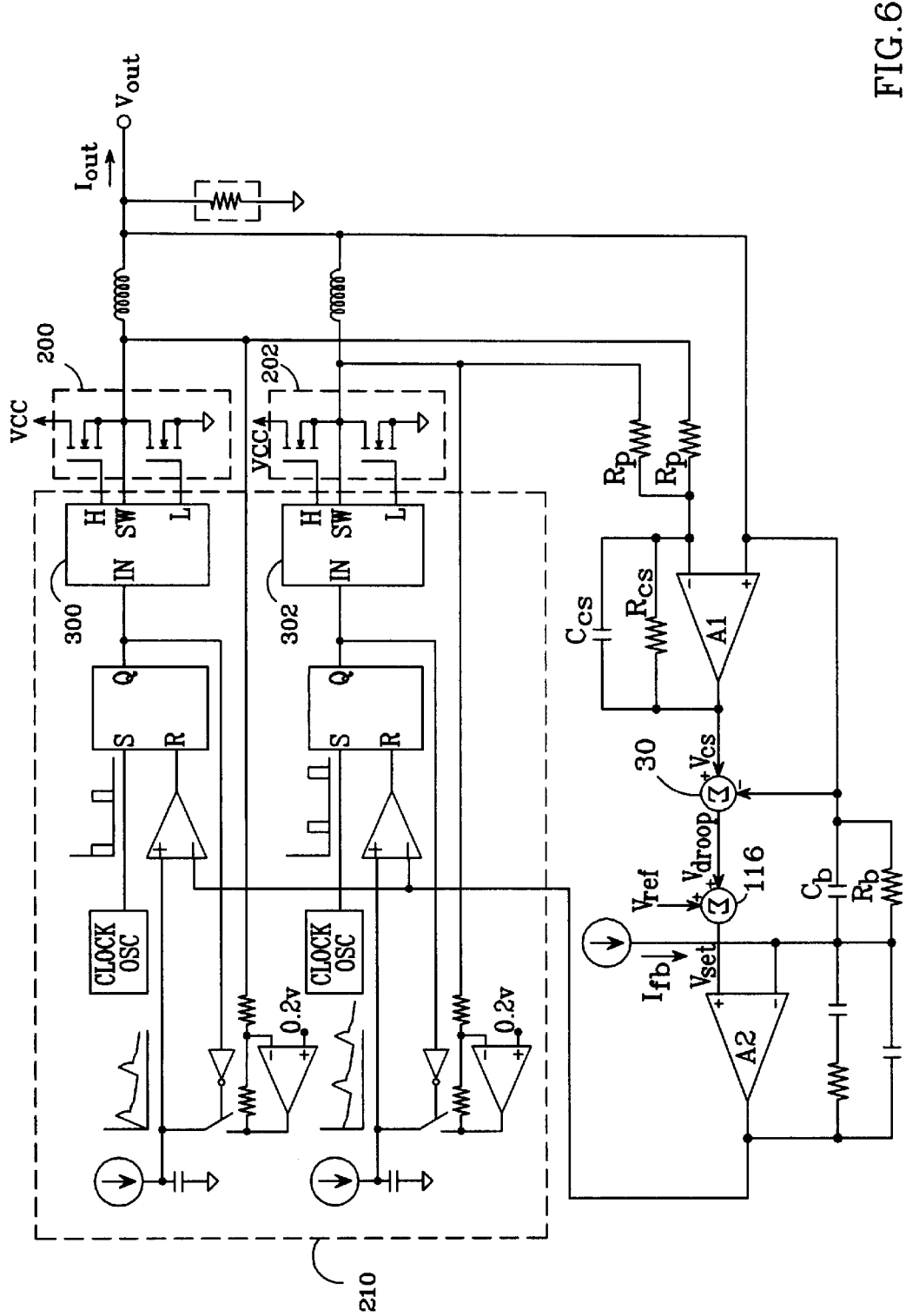
FIG. 6 is a schematic/block diagram of a multi-phase switching regulator which shows one possible implementation of the regulator's control circuitry.

One possible implementation of a control circuit 210, suitable for use with the present invention to form a multi-phase switching regulator, is shown in FIG. 6. The output inductors, total current circuit, and voltage-mode control loop circuit are as shown in FIG. 5. The control circuit includes a pair of gate driver circuits 300, 302 which provide the signals that operate the switching elements (200,202). Additional control circuitry processes the feedback signal produced by voltage control error amplifier A2 and drives the gate driver circuits. The regulator shown in FIG. 6 provides multiple feedback loop control with AVP for a two-phase converter; note that this configuration can be extended to any number of phases.

While particular embodiments of the invention have been shown and described, numerous variations and alternate embodiments will occur to those skilled in the art. Accordingly, it is intended that the invention be limited only in terms of the appended claims.

We claim:

1. A total current circuit for an N-phase switching regulator which provides an output voltage $V_{out}$ at an output terminal and which includes N output inductors carrying respective phase currents which are summed together to provide a total instantaneous inductor output current $I_{out}$ to a load connected to said output terminal, said total current circuit comprising:

N current sensing elements which carry respective ones of said phase currents, each of said elements having a switch node side and an output side, said elements' output sides connected to said regulator's output terminal, a summing circuit which sums the voltages present at the switch node sides of said sensing elements and provides said summed voltages at a summing node, and an amplifier circuit which is connected to said summing node at a first input and to said output terminal at a second input and is arranged to produce an output voltage $V_{cs}$ which is proportional to $I_{out}$.

2. The total current circuit of claim 1, wherein said summing circuit comprises N summing resistors, each of which is connected at one end to the switch node side of a respective one of said current sensing elements and is connected at its other end to said summing node.

3. The total current circuit of claim 1, wherein said N current sensing elements are said N output inductors.

4. The total current circuit of claim 1, wherein said N current sensing elements are N current sense resistors connected between respective ones of said N output inductors and said output terminal and said summing circuit sums the voltages present at the output inductor sides of said current sense resistors.

5. The total current circuit of claim 1, wherein said amplifier circuit comprises:

an operational amplifier, said first and second inputs being said op amp's inverting and non-inverting inputs, respectively, and a feedback resistor having a resistance $R_{cs}$ connected between said op amp's output and said inverting input which sets the gain of said op amp.

6. The total current circuit of claim 5, wherein said N current sensing elements are said N output inductors, each of which has a first temperature coefficient $t_c$, said feedback resistor $R_{cs}$ having a second temperature coefficient which is approximately equal to $-t_c$.

7. The total current circuit of claim 5, wherein each of said N output inductors has an inductance L and a resistance $R_1$ and said summing circuit comprises N summing resistors, each of which has a resistance $R_p$, is connected at one end to the switch node side of a respective one of said output inductors, and is connected at its other end to said summing node, further comprising a filter capacitor having a capacitance $C_{cs}$ connected across said feedback resistor, such that the output voltage $V_{cs}$ of said op amp is given by:

$$V_{cs} = V_{out} - \frac{R_{cs}R_l\left(1+s\frac{L}{R_l}\right)}{R_p(1+sC_{cs}R_{cs})}I_{out}.$$

8. The total current circuit of claim 7, wherein each of said N inductors has a time constant $L/R_1$ and the product $C_{cs}R_{cs}$ is made substantially equal to $L/R_1$ such that the output voltage $V_{cs}$ of said op amp is given by:

$$V_{cs} = V_{out} - \frac{R_l R_{cs}}{R_p}I_{out}.$$

9. The total current circuit of claim 1, further comprising a subtractor circuit which subtracts said output voltage $V_{out}$ from $V_{cs}$.

10. A total current circuit for an N-phase switching regulator which provides an output voltage $V_{out}$ at an output terminal and which includes N output inductors carrying respective phase currents, each of said inductors having a switch node side and an output side, said output sides connected together at said output terminal such that said phase currents are summed together to provide a total instantaneous inductor output current $I_{out}$ to a load connected to said output terminal, comprising:

N summing resistors, each of which is connected at one end to the switch node side of a respective one of said output inductors and is connected at its other end to a summing node, an operational amplifier which is connected to said summing node at its inverting input and to said regulator's output terminal at its non-inverting input, a feedback resistor having a resistance $R_{cs}$ connected between said op amp's output and said inverting input which sets the gain of said op amp, and a filter capacitor having a capacitance $C_{cs}$ connected across said feedback resistor, wherein each of said N summing resistors has a resistance $R_p$, and each of said N output inductors has an inductance L and a resistance $R_1$, such that the output voltage $V_{cs}$ of said op amp is given by:

$$V_{cs} = V_{out} - \frac{R_{cs}R_l\left(1 + s\frac{L}{R_l}\right)}{R_p(1 + sC_{cs}R_{cs})}I_{out}.$$

11. The total current circuit of claim 10, wherein each of said N inductors has a time constant $L/R_1$ and the product $C_{cs}R_{cs}$ is made substantially equal to $L/R_1$ such that the output voltage $V_{cs}$ of said op amp is given by:

$$V_{cs} = V_{out} - \frac{R_l R_{cs}}{R_p}I_{out}.$$

12. The total current circuit of claim 10, wherein each of said output inductors has a first temperature coefficient $t_c$ and said feedback resistor $R_{cs}$ has a second temperature coefficient which is approximately equal to $-t_c$.

13. A voltage-mode control loop for providing adaptive voltage positioning (AVP) of the output voltage $V_{out}$ of an N-phase switching regulator which provides $V_{out}$ at an output terminal and which includes N output inductors, each of which is connected between a respective one of N switching elements and said output terminal and carries a respective phase current, said phase currents summed together to provide a total instantaneous inductor output current $I_{out}$ to a load connected to said output terminal, comprising:

a control circuit which operates said switching elements in response to a voltage $V_{err}$, a total current circuit which produces an output voltage $V_{droop}$ which varies with said total instantaneous inductor output current $I_{out}$, a voltage $V_{ref}$ which represents a desired output voltage for said regulator, a summation circuit arranged to produce an output voltage $V_{set}$ which is given by:

$$V_{set} = V_{ref} + V_{droop}, \text{ and}$$

a voltage control error amplifier circuit which receives a signal which varies with $V_{out}$ at a first input and $V_{set}$ at a second input and which produces an output which varies with the difference between said first and second inputs, said output being said voltage $V_{err}$, said control circuit, said total current circuit, said summation circuit, and said voltage control error amplifier circuit arranged such that the output of said regulator has a desired droop impedance $R_o$ to provide AVP of $V_{out}$ as a function of the total instantaneous inductor output current after it has been filtered to remove its ripple component ($I_{out(fltr)}$).

14. The voltage-mode control loop of claim 13, wherein said control circuit, said total current circuit, said summation circuit, and said voltage control error amplifier circuit are arranged such that $V_{out}$ is given by:

$$V_{out} = V_{ref} - I_{out(fltr)}R_o.$$

15. The voltage-mode control loop of claim 13, wherein said total current circuit comprises:

N current sensing elements which carry respective ones of said phase currents, each of said sensing elements having a switch node side and an output side, said elements' output sides connected to said regulator's output terminal, a summing circuit which sums the voltages present at the switch node sides of said sensing elements and provides said summed voltages at a summing node, an amplifier circuit which is connected to said summing node at a first input and to said output terminal at a second input and is arranged to produce an output voltage $V_{cs}$ which is proportional to $I_o$, and a subtractor circuit which subtracts said output voltage $V_{out}$ from $V_{cs}$ to produce $V_{droop}$.

16. The voltage-mode control loop of claim 15, wherein each of said N output inductors has an inductance L and a resistance $R_1$ and a time constant $L/R_1$, said summing circuit comprising N summing resistors, each of which has a resistance $R_p$, is connected at one end to the switch node side of a respective one of said current sensing elements, and is connected at its other end to said summing node, further comprising a filter capacitor having a capacitance $C_{cs}$ connected across said feedback resistor, the product $C_{cs}R_{cs}$ made substantially equal to $L/R_1$ such that the output voltage $V_{droop}$ of said total current circuit is given by:

$$V_{droop} = \frac{R_l R_{cs}}{R_p}I_{out} = R_o I_{out},$$

and $$V_{out} = V_{ref} - I_{out(fltr)}R_o.$$

17. The voltage-mode control loop of claim 16, wherein said voltage control error amplifier circuit comprises:

an operational amplifier, a resistor having a resistance $R_b$ connected between said op amp's inverting input and $V_{out}$, and a current source providing a current $I_{fb}$ to said op amp's inverting input, said resistance $R_b$ and current $I_{fb}$ arranged to set said regulator's no-load offset voltage from $V_{ref}$ such that $V_{out} = V_{ref} - I_{out(fltr)}R_o - I_{fb}R_b$.

18. The voltage-mode control loop of claim 13, wherein said voltage control error amplifier circuit comprises an operational amplifier.

19. The voltage-mode control loop of claim 18, wherein said voltage control error amplifier circuit further comprises a compensation network connected between said op amp's output and its inverting input.

20. The voltage-mode control loop of claim 18, further comprising:

a resistor having a resistance $R_b$ connected between said op amp's inverting input and $V_{out}$, and a current source providing a current $I_{fb}$ to said op amp's inverting input, said resistance $R_b$ and current $I_{fb}$ arranged to set said regulator's no-load offset voltage from $V_{ref}$.

21. A voltage-mode control loop for providing adaptive voltage positioning (AVP) of the output voltage $V_{out}$ of an N-phase switching regulator which provides $V_{out}$ at an output terminal and which includes N output inductors, each of which is connected between a respective one of N switching elements and said output terminal and carries a respective phase current, said phase currents summed together to provide a total instantaneous inductor output current $I_{out}$ to a load connected to said output terminal, comprising:

a control circuit which operates said switching elements in response to a voltage $V_{err}$, a total current circuit which produces an output voltage $V_{droop}$ which varies with said total instantaneous inductor output current $I_{out}$, a voltage $V_{ref}$ which represents a desired output voltage for said regulator, a summation circuit arranged to produce an output voltage $V_{set}$ which is given by:

$$V_{set}=V_{ref}+V_{droop}, \text{ and}$$

a voltage control error amplifier circuit which comprises:
an operational amplifier which receives a signal which varies with $V_{out}$ at its inverting input and $V_{set}$ at its non-inverting input and which produces an output which varies with the difference between said inverting and non-inverting inputs, said output being said voltage $V_{err}$, and a loop compensation network connected between said op amp's output and its inverting input, said control circuit, said total current circuit, said summation circuit, and said voltage control error amplifier circuit arranged such that the output of said regulator has a desired droop impedance $R_o$ to provide AVP of $V_{out}$ as a function of the total instantaneous inductor output current after it has been filtered to remove its ripple component ($I_{out(fltr)}$).

22. The voltage-mode control loop of claim 21, further comprising:

a resistor having a resistance $R_b$ connected between said op amp's inverting input and $V_{out}$, and a current source providing a current $I_{fb}$ to said op amp's inverting input, said resistance $R_b$ and current $I_{fb}$ arranged to set said regulator's no-load offset voltage from $V_{ref}$.

23. An N-phase switching regulator which provides an output voltage $V_{out}$ at an output terminal and which includes N output inductors, each of which is connected between a respective one of N switching elements and said output terminal and carries a respective phase current, said phase currents summed together to provide a total instantaneous inductor output current $I_{out}$ to a load connected to said output terminal, comprising:

a control circuit which operates said switching elements in response to a voltage $V_{err}$, a total current circuit which produces an output voltage $V_{droop}$ which varies with said total instantaneous inductor output current $I_{out}$, said total current circuit comprising:

N current sensing elements which carry respective ones of said phase currents, each of said sensing elements having a switch node side and an output side, said sensing elements' output sides connected to said regulator's output terminal, a summing circuit which sums the voltages present at the switch node sides of said sensing elements and provides said summed voltages at a summing node, an amplifier circuit which is connected to said summing node at a first input and to said regulator's output terminal at a second input and is arranged to produce an output voltage $V_{cs}$ which is proportional to $I_{out}$, and a subtractor circuit which subtracts said output voltage $V_{out}$ from $V_{cs}$ to produce $V_{droop}$, a voltage $V_{ref}$ which represents a desired output voltage for said regulator, a summation circuit arranged to produce an output voltage $V_{set}$ which is given by:

$$V_{set}=V_{ref}+V_{droop}, \text{ and}$$

a voltage control error amplifier circuit which receives a signal which varies with $V_{out}$ at a first input and $V_{set}$ at a second input and which produces an output which varies with the difference between said first and second inputs, said output being said voltage $V_{err}$, said control circuit, said total current circuit, said summation circuit, and said voltage control error amplifier circuit arranged such that the output of said regulator has a desired droop impedance $R_o$ to provide active voltage ositioning (AVP) of $V_{out}$ as a function of the total instantaneous inductor output current after it has been filtered to remove its ripple component ($I_{out(fltr)}$).

24. The switching regulator of claim 23, wherein said control circuit, said total current circuit, said summation circuit, and said voltage control error amplifier circuit are arranged such that $V_{out}$ is given by:

$$V_{out}=V_{ref}-I_{out(fltr)}R_o.$$

25. The switching regulator of claim 23, wherein each of said N output inductors has an inductance L, a resistance $R_1$, and a time constant $L/R_1$, said summing circuit comprising N summing resistors, each of which has a resistance $R_p$, is connected at one end to the switch node side of a respective one of said output inductors, and is connected at its other end to said summing node, further comprising a filter capacitor having a capacitance $C_{cs}$ connected across said feedback resistor, the product $C_{cs}R_{cs}$ made substantially equal to $L/R_1$ such that the output voltage $V_{droop}$ of said total current circuit is given by:

$$V_{droop} = \frac{R_l R_{cs}}{R_p} I_{out} = R_o I_{out},$$

and $$V_{out}=V_{ref}-I_{out(fltr)}R_o.$$

26. The switching regulator of claim 25, wherein said voltage control error amplifier circuit comprises:

an operational amplifier, a resistor having a resistance $R_b$ connected between said op amp's inverting input and $V_{out}$, and a current source providing a current $I_{fb}$ to said op amp's inverting input, said resistance $R_b$ and current $I_{fb}$ arranged to set said regulator's no-load offset voltage from $V_{ref}$ such that $V_{out}=V_{ref}-I_{out(fltr)}R_o-I_{fb}R_b$.

* * * * *